UNITED STATES PATENT OFFICE.

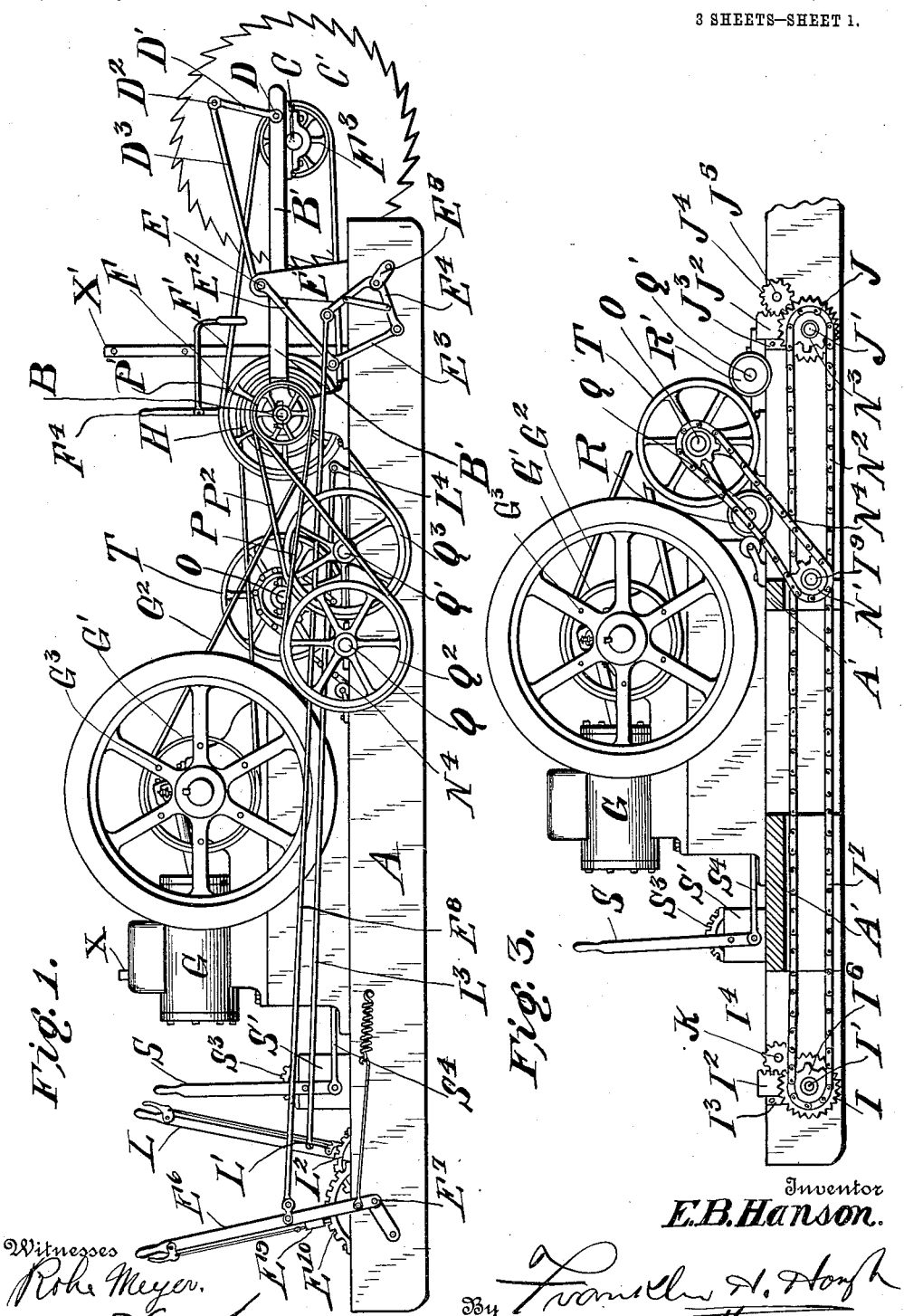

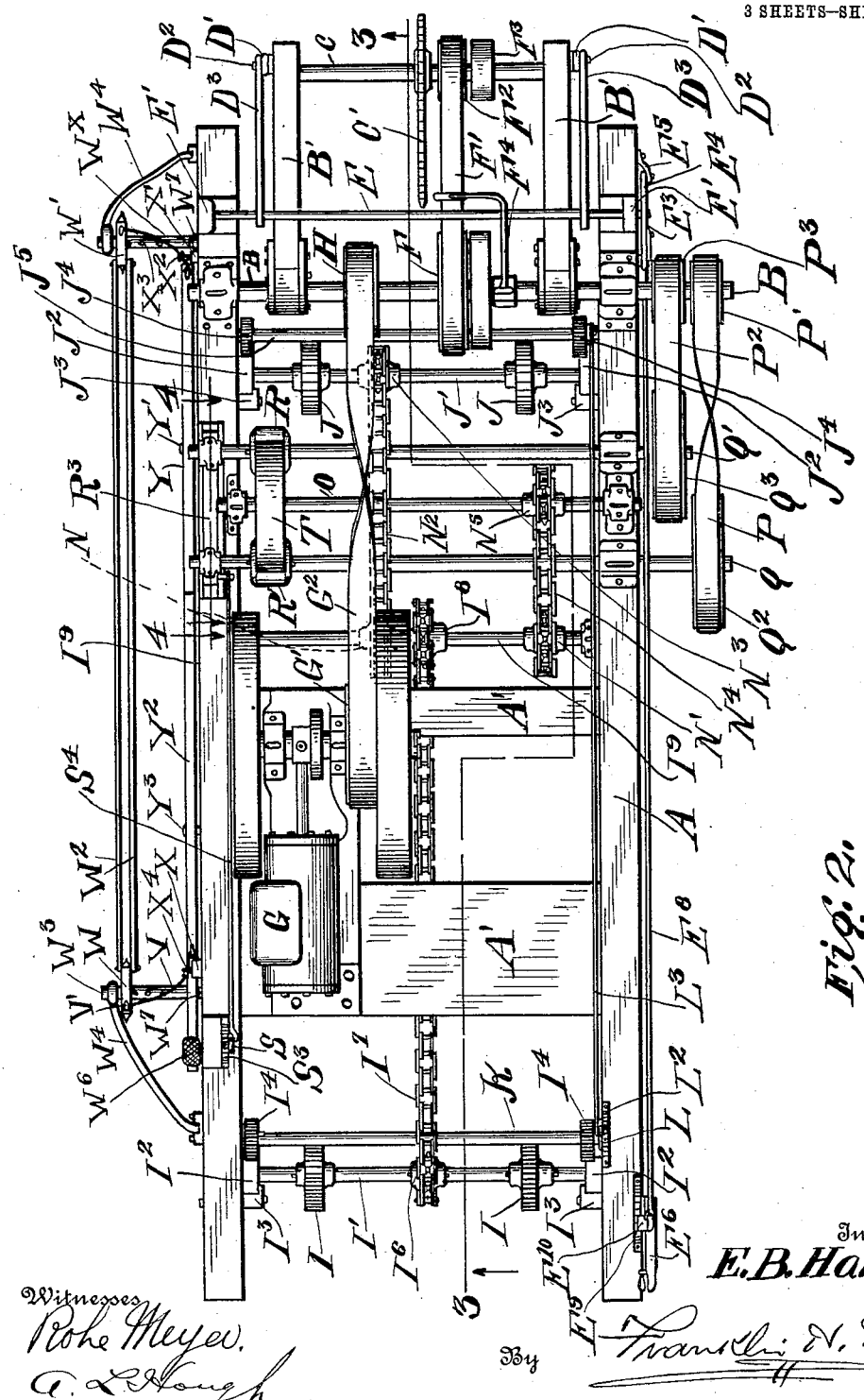

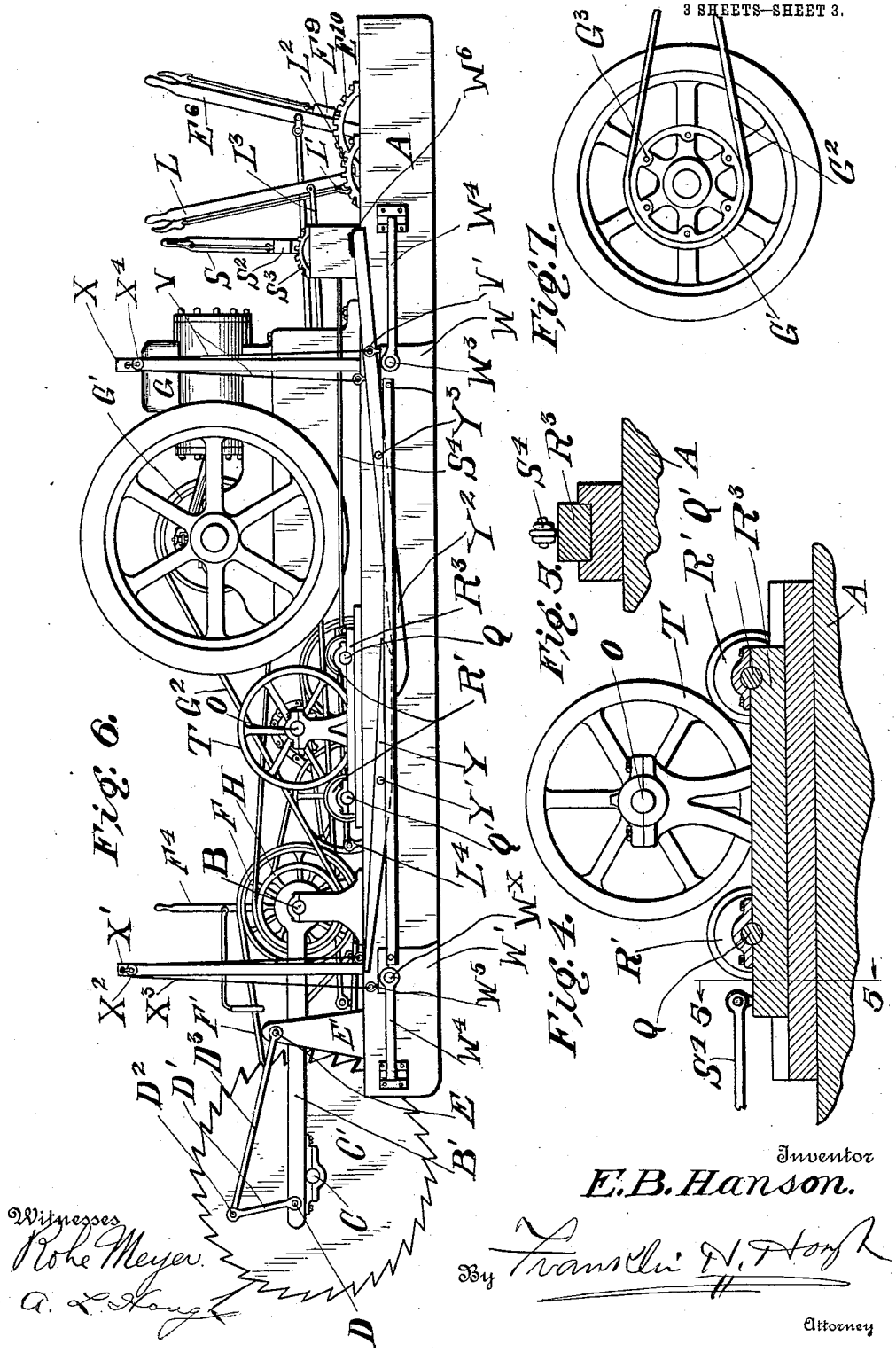

EDWARD B. HANSON, OF BUXTON, MAINE.

ICE-CUTTING MACHINE.

1,058,055.  Specification of Letters Patent.  Patented Apr. 8, 1913.

Application filed April 30, 1912. Serial No. 694,182.

*To all whom it may concern:*

Be it known that I, EDWARD B. HANSON, a citizen of the United States, residing at Buxton, in the county of York and State of Maine, have invented certain new and useful Improvements in Ice-Cutting Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for cutting ice and comprises a simple and efficient apparatus of this nature having various details of construction and combinations and arrangements of parts which will be hereinafter fully described, shown in the accompanying drawings and then specifically defined in the appended claims.

My invention is illustrated in the accompanying drawings, in which:—

Figure 1 is a side elevation of the apparatus. Fig. 2 is a top plan view. Fig. 3 is a vertical sectional view on line 3—3 of Fig. 2, showing parts in elevation. Fig. 4 is a sectional view on line 4—4 of Fig. 2. Fig. 5 is a section on line 5—5 of Fig. 4. Fig. 6 is a view in elevation of the opposite side of machine shown in Fig. 1, and Fig. 7 is a detail view showing means of securing pulley G' to fly wheel.

Reference now being had to the details of the drawings by letter, A designates the runners of the apparatus held parallel to each other by the cross-pieces A'. Pivotally mounted upon the shaft B are the beams B' which, at their outer ends, carry the arbor C upon which the saw C' is fixed, said frame being adapted to have a vertical swinging movement. Pivotally connected to a pin D upon one of said beams B' is a link D' which at $D^2$ is pivotally connected to an arm $D^3$ which in turn is fixed to a shaft E journaled in bearings in the standards E'. The shaft E has fixed thereto a second arm $E^2$ which has pivotal connection through the medium of the link $E^3$ with one arm of the angle lever $E^4$, which latter is pivotally mounted upon a pin $E^5$ fixed to one of the runners.

An operating lever, designated by letter $E^6$, is pivotally connected to a pin $E^7$ upon the runner and a rod $E^8$ pivotally connects one arm of the angle lever with the lever $E^6$, shown clearly in Fig. 1 of the drawings. A hand-operated pawl $E^9$ is mounted upon the lever $E^6$ and adapted to engage notches in the segment $E^{10}$ for the purpose of holding the saw at different elevations.

Upon reference to Fig. 2 of the drawings, it will be noted that a driving pulley F is fixed to the shaft B and has belted connection F' with a pulley $F^2$ fixed to the saw arbor. An idler pulley $F^3$ is journaled upon the arbor and from which the belt may be shifted by means of the pivotal lever $F^4$.

An engine G is mounted upon a suitable base which is supported by the runner and affords means for supplying power to drive the saw and also to propel the apparatus. The pulley G' secured to the arms of the fly wheel by bolts $G^3$ has a belted connection $G^2$ with a pulley H which is fixed to the shaft B, affording means for driving the latter.

The means for propelling the apparatus consist of the spur wheels I which are fixed to the shaft I' journaled in suitable bearings in the rack bars $I^2$, having vertical movements intermediate guide strips $I^3$ and the pinion wheels $I^4$ which are keyed to the shaft K which is journaled in suitable bearings in the opposite runners near one end of the apparatus. Similar spur wheels J are fixed to the shaft J' journaled in suitable bearings in the rack bars $J^2$ movable between guides $J^3$ and pinions $J^4$ which are fixed to the shaft $J^5$ journaled in the runners.

The means for raising and lowering the spur wheels consist of the lever L which is fixed to the shaft K and carries a hand-operated pawl L' adapted to engage the teeth of the segment $L^2$. A rod $L^3$ pivotally connects the lever L with the lever $L^4$ which is fixed to the shaft $J^5$, affording means whereby, as the said lever is moved in one direction or the other, the two sets of spur wheels may be raised so that their lower portions will be above the bottom of the runners or lowered so that they will engage with the ice.

Fixed to the shaft I' is a sprocket wheel $I^6$ about which a sprocket chain $I^7$ passes and which latter also passes about a sprocket wheel $I^8$ fixed to the shaft $I^9$. Also fixed to the shaft $I^9$ are the two sprocket wheels N and N' and a sprocket chain $N^2$ passes about the sprocket wheel N' and a sprocket wheel $N^3$ which is fixed to the shaft J'. A sprocket chain $N^4$ passes about the sprocket wheel N and a sprocket wheel $N^5$ which is fixed to the shaft O journaled in suitable bearings supported by the runners.

Two shafts, designated respectively by letters Q and Q', are journaled at corresponding ends in bearings in one of the runners and have their opposite ends journaled in an adjustable bearing box R³ which is mounted upon the other of said runners. A pulley wheel Q² is fixed to the shaft Q and a similar pulley Q³ is fastened to the shaft Q'. A belt P passes about a pulley P' upon the shaft B and also about the pulley Q², also a belt P² passes about the pulley P³ upon the shaft B and said pulley Q³. Fixed to the shaft Q' is a frictional driving pulley R and a similar pulley R' is fastened to the shaft Q. Said friction pulleys are adapted to have a movement in contact with or away from the friction pulley T which is fixed to the shaft O. A lever S is pivotally mounted upon a standard S' and has a hand-operated pawl S² for engagement with the teeth of the rack S³ and a rod S⁴ pivoted at one end to the lower end of the lever S and its other end is fastened to the movable boxing R³, serving as means for throwing the friction wheels R and R' into or out of engagement with the circumference of the frictionally driven wheel T.

Means for marking the ice to be cut consists of the two blades W and W' which are fastened to the bars W² and which blades are adapted to have a lateral adjustment upon the rods W³ and Wˣ respectively, the outer ends of which are supported by the brace bars W⁴, while the inner ends are hinged to the runner as at W⁷ so as to allow the blades W to be raised or lowered so that they may come in or out of contact with the ice when the levers Y and Y² are actuated.

Standards X and X' rise from one of the runners and upon the latter of said standards X' is a pulley X² about which a cable X³ passes and which is fastened at one end to an eye W⁵ upon one of said marking blades W' and at the other end to one end of the pivotal lever Y mounted upon the pivot pin Y'. A second lever Y², pivoted upon a pin Y³, has its inner end extending underneath the adjacent end of the lever Y, affording means whereby, as the lever Y² tilts, the lever Y will also tilt. Mounted upon the standard X is a pulley X⁴ about which a cable V passes and which is secured at one end to the lever Y² and its other end to an eye V' fastened to the blade W. One end of the lever Y² has a foot tread W⁶, affording means whereby an operator by depressing upon said foot tread may cause the two levers Y² and Y to tilt and, through their cable connections with the marking blades, cause the same to be raised.

The operation of my invention will be readily understood and is as follows: By the manipulation of the lever L, the spur wheels may be thrown down to project below the bottoms of the runners. Power being supplied by the engine will drive the saw arbor, the saw being adapted to be raised and lowered through the medium of the lever E⁶ and connections with said arbor, thus regulating the depth at which it is desired to have the saw cut through the ice. Power is applied to the shaft Q and Q' through the belted connections shown, thus rotating the friction driving wheels. A swinging movement of the lever S will cause the friction driving pulleys R and R' to be moved in frictional contact with the pulley T, thereby causing the latter to rotate and, through the belted sprocket wheel and chain connections, cause the spur wheels to rotate and engage the surface of the ice beneath the runners and cause the apparatus to be moved back and forth, according to the direction of rotation of the spur wheel. The depression of the foot tread W⁶ will serve to raise the marking blades from the ice.

What I claim to be new is:—

1. An apparatus for cutting ice comprising runners, swinging beams mounted thereon, an arbor carried by said beams, a saw fixed to said arbor, a motor and belted connections for driving the arbor, vertically movable rack bars mounted upon the runners, a spur wheel pivoted to each rack bar, pinions in mesh with the rack bars, gear connections between the spur wheels, means for raising and lowering the rack bars, friction driving mechanism, and gear connections therewith for rotating the spur wheels, as set forth.

2. An apparatus for cutting ice comprising runners, swinging beams mounted thereon, an arbor carried by said beams, a saw fixed to said arbor, a motor and belted connections for driving the arbor, vertically movable rack bars mounted upon the runners, a spur wheel pivoted to each rack bar, pinions in mesh with the rack bars, gear connections between the spur wheels, means for raising and lowering the rack bars, friction driving mechanism, gear connections therewith for rotating the spur wheels, and vertically adjustable marking blades mounted upon one of the runners, as set forth.

3. An apparatus for cutting ice comprising runners, swinging beams mounted thereon, an arbor carried by said beams, a saw fixed to said arbor, a motor and belted connections for driving the arbor, vertically movable rack bars mounted upon the runners, a spur wheel pivoted to each rack bar, pinions in mesh with the rack bars, gear connections between the spur wheels, means for raising and lowering the rack bars, friction driving mechanism, gear connections therewith for rotating the spur wheels, rods projecting from one of the runners, marking blades mounted upon said rods, standards upon one of the runners, pulleys upon the standards, cables passing about the pulleys and fastened to said marking blades, pivotal levers mounted upon one of the runners, one of said levers overlapping the other and affording means whereby, as one of the levers is tilted, the other may be caused to tilt, thereby raising said marking blades, as set forth.

4. An apparatus for cutting ice comprising runners, swinging beams mounted thereon, an arbor carried by said beams, a saw fixed to said arbor, a motor and belted connections for driving the arbor, vertically movable rack bars mounted upon the runners, a spur wheel pivoted to each rack bar, pinions in mesh with the rack bars, gear connections between the spur wheels, means for raising and lowering the rack bars, friction driving mechanism, gear connections therewith for rotating the spur wheels, rods projecting from one of the runners, marking blades, a bar to which the latter are fastened, standards upon one of the runners, pulleys upon said standards, cables passing about the pulleys and fastened one to each of said blades, pivotal levers mounted upon one of the runners with their inner ends overlapping one above the other, a foot tread upon one lever affording means whereby, as said foot tread is depressed, the other lever will be tilted, thereby causing the two marking blades to be raised, as set forth.

5. An apparatus for cutting ice comprising runners, a motor, a driving shaft connected therewith, swinging beams mounted upon the driving shaft, an arbor journaled in suitable bearings upon said beams, pulleys upon the arbor, a link pivoted to one of said beams, a rock shaft, an arm fixed to the latter and pivoted to said link, a pivotal angle lever and pivotal link and arm connections between the same and the rock shaft, an operating lever with pivotal link connections between the same and the angle lever for raising and lowering the saw, vertically adjustable rack bars mounted upon the runners, spur wheels journaled upon said rack bars, counter shafts journaled in the runners, friction pulleys fixed to the counter shafts, a frictionally driven pulley and shaft upon which the same is mounted, and sprocket chain and wheel connections intermediate the shaft carrying said friction wheel and spur wheel, as set forth.

In testimony whereof I hereunto affix my signature in the presence of two witnesses.

EDWARD B. HANSON.

Witnesses:
ALBERT R. PENNELL,
LESTER G. SANDS.

---

Copies of this patent may be obtained for five cents each, by addressing the "Commissioner of Patents, Washington, D. C."